F. TOMASEK.
AUTOMOBILE BUMPER.
APPLICATION FILED NOV. 14, 1921.
1,416,426.
Patented May 16, 1922.
2 SHEETS—SHEET 1.
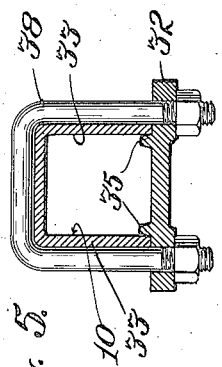
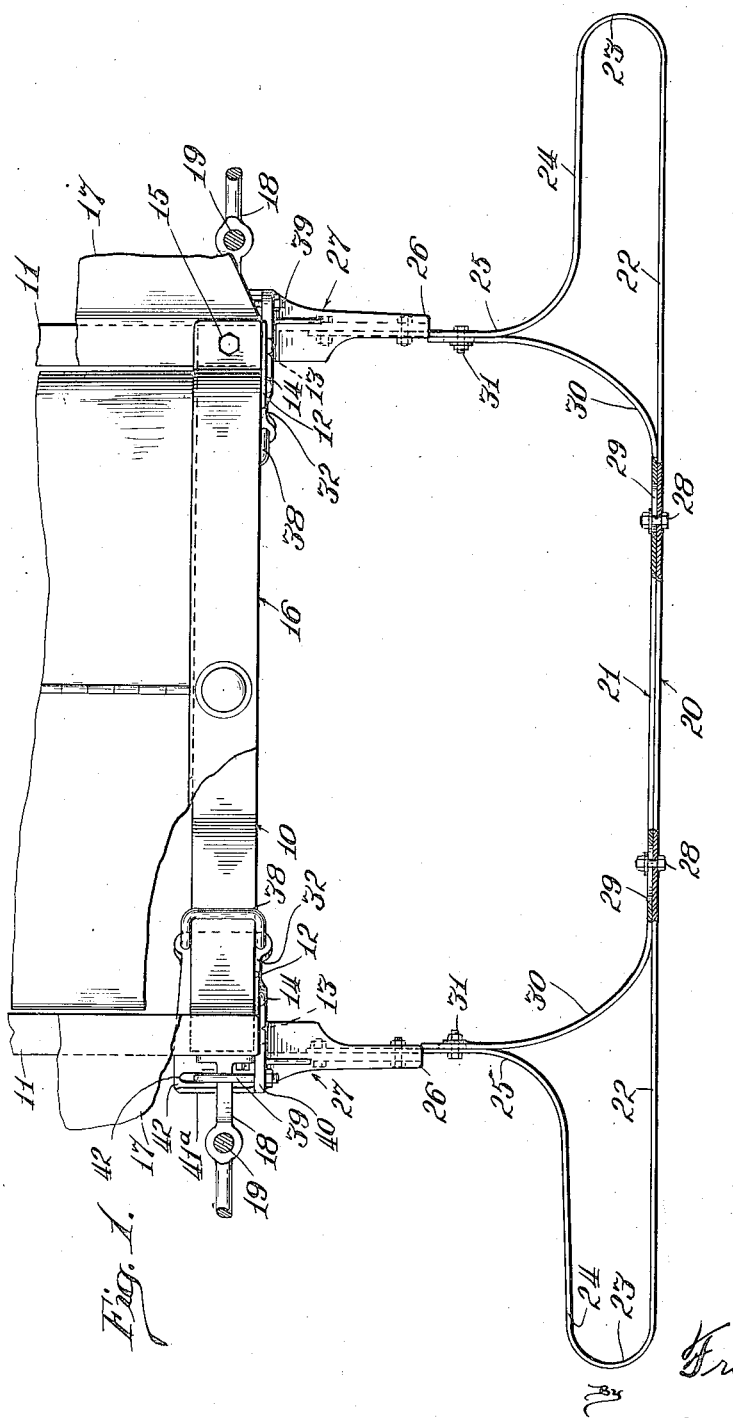
Inventor
Frank Tomasek
By
Barnett & Truman
Attorneys

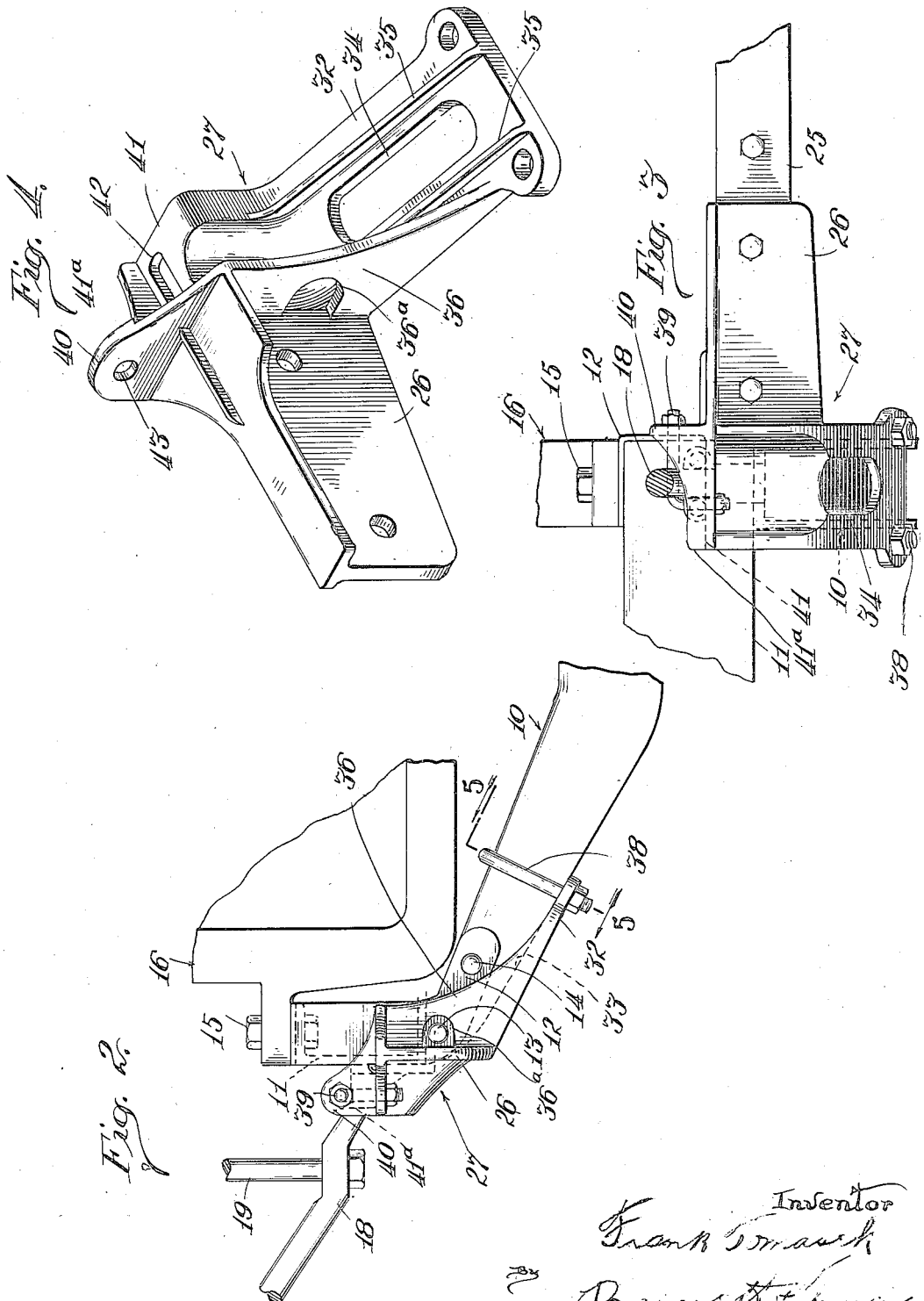

UNITED STATES PATENT OFFICE.

FRANK TOMASEK, OF CHICAGO, ILLINOIS.

AUTOMOBILE BUMPER.

1,416,426.   Specification of Letters Patent.   Patented May 16, 1922.

Application filed November 14, 1921. Serial No. 514,896.

*To all whom it may concern:*

Be it known that I, FRANK TOMASEK, a citizen of the United States, residing at Chicago, in the county of Cook and State of Illinois, have invented certain new and useful Improvements in Automobile Bumpers, of which the following is a specification.

My invention relates to bumpers for automobiles, and has for its object to provide a new and improved bumper construction that may be readily attached to the more accessible portions of the framing or other rigid members of an automobile by persons having no mechanical skill, and to provide novel fastening means whereby the bumpers may be drawn tightly against a vertical face and lower edge of a cross member, or other equivalent parts of the automobile framing, and held rigidly in such position.

The invention has for further objects the novel constructions, arrangements and combinations of parts, hereinafter described and claimed, for carrying out the above stated objects, and such other objects as will appear from the following description of the invention.

The invention is illustrated in a preferred embodiment in the accompanying drawings wherein—

Fig. 1 is a fragmentary view in plan of the front end of a motor vehicle of the "Ford" type, showing a bumper constructed and attached, in accordance with my invention to an automobile of the "Ford" type, certain parts of the automobile being broken away for the purpose of clearness.

Fig. 2 is a fragmentary view in elevation, of one of the supporting members for the bumper bars, illustrating the manner in which it is attached to the framing of the automobile.

Fig. 3 is a side view in elevation of the structure shown in Fig. 2.

Fig. 4 is a view in perspective of one of my improved bumper bar supporting members; and Fig. 5 is a sectional view taken on line 5—5 of Fig. 2.

Like characters of reference designate corresponding parts in the several figures of the drawings.

I have illustrated my invention, for the pupose of convenience only, in connection with an automobile of the "Ford" type, and will therefore first describe generally the parts of the automobile shown.

In the drawings, 10 designates the front body bolster, which is of an inverted channel shape in cross-section, and 11, 11 the longitudinal sills at the sides of the chassis. The side sills are secured to the ends of the body bolster by means of angular gussets 12, 12, the gussets being riveted to the front flange of the body bolster by rivets 13 and 14 and bolted to the top flange of the side sills by bolts 15. The radiator frame of the automobile is indicated by the reference numeral 16, the fenders by numerals 17, 17, and the brackets for supporting the forward ends of the fenders are indicated by the numerals 18, 18. These brackets are rigidly secured to the side sills of the automobile framing and carry an upstanding post 19 for supporting the usual headlights (not shown).

My improved bumper construction may be described generally as consisting of an impact member, supporting members to which the impact member is attached, and means for rigidly fastening said supporting members to the framing and other rigid parts of the automobile.

The impact member is preferably made of spring metal, and consists of an outer bar 20 and an inner bar 21. The outer bar is provided with a relatively long flat face portion 22 and is bent at 23, 23 to form inwardly projecting portions 24, 24, which are preferably parallel with the outer face of the bar. The ends 25, 25 of this bar are curved rearwardly to a position substantially at right angles to the front face 22, and are securely fastened to forwardly projecting arms 26, 26 of the supporting members 27, 27. The inner bar 21 is provided with a flat face, shorter than the corresponding face of the outer bar, which is arranged parallel to the flat face of the outer bar and is secured thereto with capacity for relative movement by bolts 28, the bolts extending through slots 29 in the inner bar. The ends 30, 30 of the inner bar are curved rearwardly and secured to the end portions 25, 25 of the outer bar by bolts 31.

The supporting brackets 27, 27, consist in each case of a forwardly projecting arm 26 to which the ends of the impact members are secured, and an inclined base plate 32. The base plate is formed, at its juncture, with the arm 26, with a curve corresponding with the curvature of the ends of the depending flanges 33 of the body bolster 10 of the automobile chassis. In order to make the base plate as light as possible without sacrifice of strength and rigidity, I preferably provide the central portion of the plate with an opening 34, and form the plate with rigidifying ribs 35, 35, which fit within the channeled portions of the body bolster 10. The forward edge of the base plate 32 is provided with a relatively wide rigidifying flange 36, adapted to bear firmly against the front face of the body bolster. In order to provide a firm, flat engagement between the web 36 and the body bolster, I preferably provide the web with an aperture 36ª, adapted to fit over the head of the rivet 13. The supporting members are preferably clamped rigidly to the lower edges and front face of the body bolster 10, and to the fender bracket 18 by means of U-bolts 38, which fit over the body bolster and extend through perforations in the supporting member, and angular or L-bolts 39 which extend around the base portion of the fender bracket 18 and engage with an upstanding web 40 and with a horizontal web 41 of the supporting member. The upstanding web 40 and horizontal web 41 are rigidified by the web 41ª, so that they will not be bent or broken by the tightening of the L-bolt 39. In order to permit the L-bolt to be readily applied, the supporting member is provided with an elongated opening 42 through which one end of the L-bolt extends. In the preferred construction, this elongated opening is formed in the horizontal web 41 of the supporting member. With such construction, the vertical leg of the L-bolt may be inserted in the opening 42 and then moved rearwardly therein to permit the horizontal leg of the bolt to enter the bolt-hole 43 in the web 40.

From the above it will be seen that I have provided a novel means of clamping the supporting members to the automobile whereby the outer ends of each supporting member may be clamped firmly against the vertical face and the lower edges of the body bolster by the tightening of the nuts on the opposite ends of a single bolt member, thereby minimizing the number of bolts required, and simplifying the means of fastening the bumper to the automobile framing. The other parts of the bumper construction, as above described, it will be seen, are so formed and connected with each other as to be capable of being readily applied to an automobile, or removed therefrom, and are so rigidified as to provide the maximum strength for minimum weight of material.

While I have illustrated my invention in connection with one specific embodiment, showing certain specific construction, and means of attachment, it will be obvious that modifications in structure and attachments might be made without departure from the spirit of my invention. I therefore wish it understood that I do not limit myself to the specific construction and form of attachment, described herein, except in so far as specifically limited in the appended claims.

I claim:

1. An automobile bumper comprising an impact member, supporting brackets for said impact member adapted to bear against the lower edge and a vertical face of one of the frame members of an automobile, and means associated with each of said brackets for clamping it to said frame member comprising a fastening device engaging a part of said automobile adapted when tightened to exert a vertical and lateral force to draw said supporting bracket into clamping engagement with said lower edge and vertical face of said frame member.

2. An automobile bumper comprising an impact member, supporting brackets for said impact member adapted to bear against the lower edge and a vertical face of one of the frame members of an automobile, and means associated with each of said brackets for clamping it to said frame member comprising an L-bolt engaging a part of said automobile adapted when tightened to exert a vertical and lateral force to draw said supporting bracket into clamping engagement with said lower edge and vertical face of said frame member.

3. In an automobile bumper, the combination with a transverse frame member and the fender brackets of an automobile, of an impact member, supporting brackets for said impact member adapted to be clamped to and bear against the lower and vertical surfaces of said frame member, and means for clamping said supporting brackets to said frame member comprising bolting devices adapted to engage with said fender brackets and exert vertical and lateral force when tightened, to clamp said supporting brackets in their operative position.

4. In an automobile bumper, the combination with a transverse frame member and the fender brackets of an automobile, of an impact member, supporting brackets for said impact member adapted to be clamped to and bear against the lower and vertical surfaces of said frame member, and means for clamping said supporting brackets to said frame member comprising L-bolts adapted to engage with said fender brackets and exert vertical and lateral force when tightened, to clamp said supporting brackets in their operative position.

5. In an automobile bumper, the combination with a transverse frame member and the fender brackets of an automobile, of an impact member, supporting means for said impact member adapted to be clamped to the lower and vertical surfaces of said frame member, comprising an angular member having a base plate inclined downwardly and curved to correspond to the outline of the ends of said frame member and terminating in a flat horizontally disposed flange and provided with a vertical web adapted to bear against said vertical face of the frame, and means for clamping said supporting means in position comprising a bolt adapted when tightened to draw said angular member into clamping engagement with said lower and vertical surfaces of said frame member.

6. In an automobile bumper, the combination with a transverse frame member and the fender brackets of an automobile, of an impact member, supporting means for said impact member adapted to be clamped to the lower and vertical surfaces of said frame member, comprising an angular member having a base plate inclined downwardly and curved to correspond to the outline of the ends of said frame member and terminating in a flat horizontally disposed flange having an elongated opening therein, and provided with a vertical web having a bolt hole therein and adapted to bear against said vertical face of the frame, and means for clamping said supporting means in position comprising an L-bolt which fits over said fender bracket with its vertical portion extending through said elongated opening and its horizontal portion extending through said bolt hole in said vertical web, whereby the tightening of said bolt clamps said angular member into clamping engagement with said lower and vertical surfaces of said frame member.

FRANK TOMASEK.